3,458,613
METHOD OF CURING OF RESIN-BONDED CORES
Robert S. L. Andrews, Tyler, Tex., and George H. Smith, Burlington, N.J., assignors to Amsted Industries Incorporated, Chicago, Ill., a corporation of New Jersey
Filed Oct. 5, 1964, Ser. No. 438,804
Int. Cl. B29g 7/00
U.S. Cl. 264—123      2 Claims

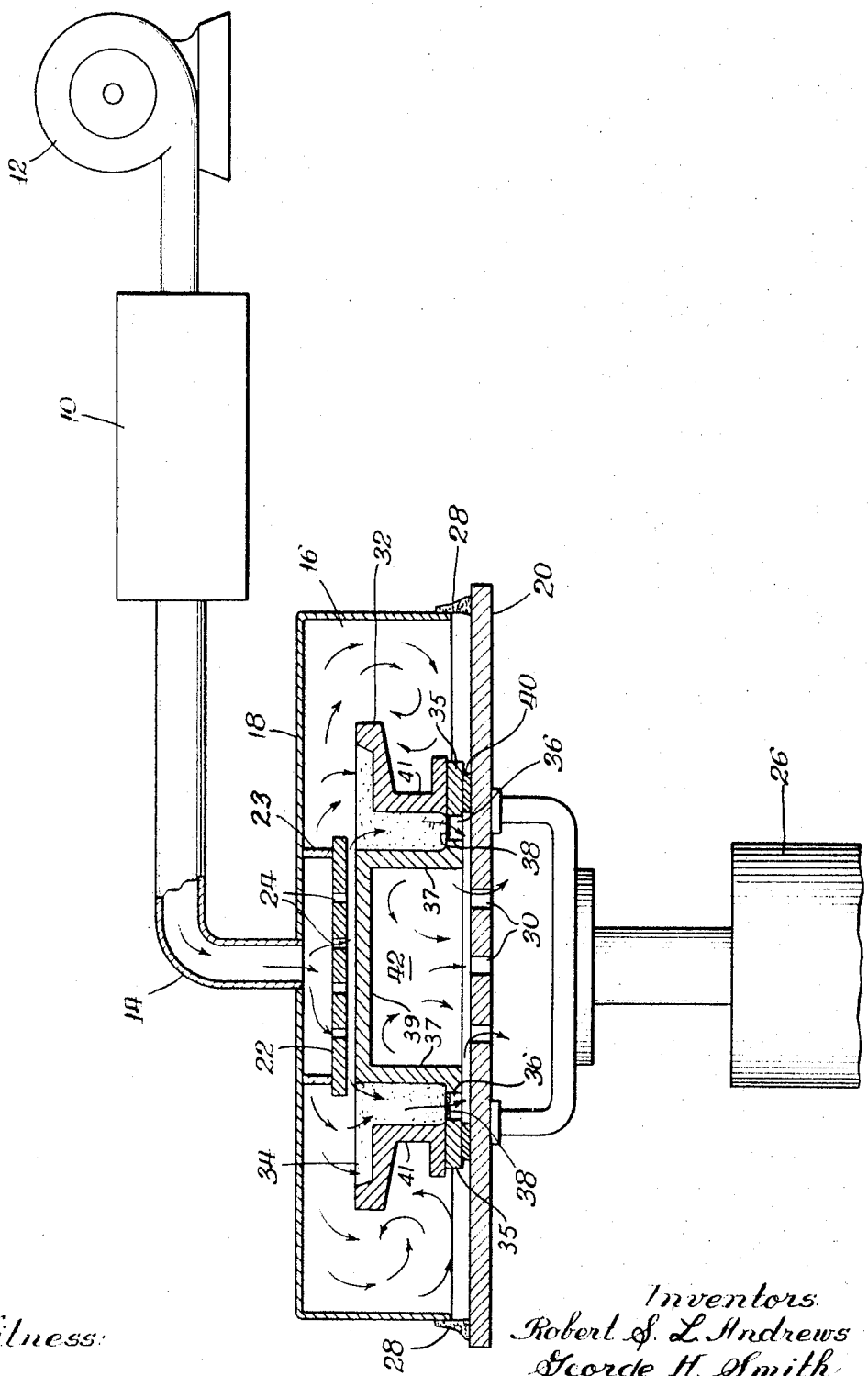

ABSTRACT OF THE DISCLOSURE

In a method of making shell molds, hot air is forced around a receptacle containing sand coated with thermosetting resin and then passed through the sand. The temperature of the air is greater than the curing temperature of the binder.

---

This invention relates to metal founding and, more particularly, to an improved method and apparatus for curing resin-bonded sand cores, molds and the like.

It is well known in the art to form cores and molds of a particulate refractory material, such as silica sand, to which a thermosetting phenolic resin binder is added either in powdered form or in a solvent to achieve uniform coating of the grains of sand. Other types of sand may be used such as zircon, olivine, forsterite, etc. If desired, dust suppressants may be employed for health purposes and in some instances a release agent is incorporated in the mixture to prevent the shell mold being prepared from adhering to the pattern.

The mold or core is heated, as in an oven, to cure the resin binder before the mold or core is used in a casting operation. When the mixture of sand and resin is heated, the resin in the outer portions of the mass of sand and resin (e.g., adjacent to the walls of the core box) is exposed to the greatest amount of heat and, accordingly, is cured at a more rapid rate than the resin lying deep within the mass. Inasmuch as the resin in the innermost portions of the mixture receives heat only through the at least partly cured outer portions of the mass and the mixture has an insulating effect, there is a significant time lag until the innermost portions of the resin are cured.

This invention is based on an apparatus and method for curing the phenolic resin binder of a mixture utilized in preparing a foundry mold or core in a fraction of the time which is usually required. In preparing a core in accordance with this invention, a core box which has been filled with a mixture comprising sand and an uncured thermosetting resin is placed within a chamber wherein air is continuously introduced at a temperature higher than the curing temperature of the resin. The apparatus, including the core box which is used, is designed so that the heated air is circulated about the exterior of the core box to heat the same, after which the air is then caused to pass through the mixture. The circulation of the heated air through the permeable mass subjects substantially all of the resin, even in the innermost portions of the core, to a simultaneous heating so that a rapid curing of the core is obtained. These same general principles of this invention are also applicable to the preparation of molds.

It is, therefore, a primary object of this invention to provide an apparatus and a method which may be used for curing molds and cores faster than by conventional methods.

Another object of this invention is to provide an apparatus and method for curing resin-bonded cores and molds wherein heated air is forced through a sand-resin mixture.

A further object of this invention is to provide an apparatus and method for curing resin-bonded cores and molds wherein heated air is circulated through a sand-resin mixture after it has been used to heat the outside of the receptacle containing the mixture.

Still another object of this invention is to provide an apparatus and method for curing resin-bonded cores and molds wherein substantially all of the resin is subjected to heated air at the same time.

These and further objects of this invention will become apparent or be described as the description thereof herein proceeds and reference is made to the accompanying drawing which is an elevation, partly in section and partly schematic, of an apparatus embodying this invention.

Referring to the accompanying drawing, air that has been heated within heater 10 is forced by blower 12 through conduit 14 into chamber 16. As the heated air enters chamber 16, defined within stationary bell-shaped hood 18 and bottom plate or base 20, it strikes baffle plate 22 which is held spaced from conduit 14 by a plurality of spaced ribs 23. Baffle plate 22 is provided with apertures 24 so as to distribute the heated air within chamber 16. Bottom plate 20 is connected to a suitable mechanism, such as pneumatic lift cylinder 26, for moving bottom plate 20 up and down in reference to hood 18. In its uppermost position, bottom plate 20 is engaged by resilient seal 28, resistant to deterioration at high temeratures, about the periphery of hood 18 to seal bottom plate 20 against hood 18. Chamber 16 is vented to the atmosphere through vents 30 in bottom plate 20 when bottom plate 20 is in the upper, closed position.

Disposed within chamber 16 is core box 32 filled with mixture 34 from which the core is prepared. Mixture 34 is comprised of a particulate refractory material and an uncured thermosetting binder, e.g., sand and an uncured phenolic resin. A bottom wall or flange 35 of core box 32 is provided with at least one opening 36 located so that a gas introduced under pressure into mixture 34 through the open top of core box 32 will circulate through a substantial portion of mixture 34 before it escapes through opening 36. The bottom wall 35 extends outwardly from the bottom of a continuous inner wall 37 having at its upper end a top wall 39. A shell member having a continuous side wall 41 is seated on flange 35 outwardly of openings 36. Preferably, core box 32 is provided with a plurality of such openings 36 which are covered with screening 38 of small enough mesh to prevent mixture 34 from running out of core box 32. Resilient annular gasket 40 is provided between bottom plate or base 20 and core box 32 radially outwardly of openings 36. Vents 30 and openings 36 are located within the areas of bottom plate 20 and bottom wall of core box 32, respectively, encompassed by gasket 40 to assure that the only path of escape of the gas introduced into chamber 16 is through mixture 34, out of core box through openings 36, and thence out vents 30 into the atmosphere.

It will be noted in the accompanying drawing that core box 32 is illustrated as being designed to form an annular core and, accordingly, secondary chamber 42 is formed between bottom plate 20 and core box 32. In such instances, it is preferred that vents 30 are not aligned with openings 36, as illustrated, so that the heated air entering secondary chamber 42 through openings 36 will circulate within chamber 42 to heat the interior of core box 32 before escaping through vents 30.

It will be evident that the designs of chamber 16, formed by hood 18 and bottom plate 20, and core box 32 are mutually dependent upon one another. More specifically, the location of vents 30 in bottom plate 20 are dependent upon the specific core box used. In addition, the size of chamber 16 with respect to core box 32 is such that the top wall 39 and the continuous side wall 41 of core box 32 are spaced from bell-shaped hood 18 to permit the heated air which is introduced through conduit 14 to circulate about the exterior of core box 32 before it escapes by way of mixture 34, openings 36 and vents 30.

As a specific example of the method of this invention, core box 32 is filled with mixture 34 comprising 95% silica sand, 3% two-stage permanently fusible thermoplastic phenolic resin, and 2% one-stage thermosetting phenolic resin. Core box 32 is placed on bottom plate 20 over vents 30 with gasket 40 in place, after which bottom plate 20 is raised until it is engaged by seal 28 in fluid-tight relationship therewith. Blower 10 forces air heated to 500° F. by heater 12 into the interior of chamber 16 at a pressure of 3 p.s.i.g. and at a rate of 500 c.f.m.

The heated air which is introduced into chamber 16 circulates through the apparatus as illustrated by the arrows in the accompanying drawing. The pressurized heated air is initially distributed by baffle plate 22 so that it circulates about the exterior of core box 32. The pressure differential existing between chamber 16 and the atmosphere then causes the air to pass through mixture 34 and out of core box 32 through openings 36, circulate through secondary chamber 42, and then escape to the atmosphere through vents 30. It will therefore be seen that heat to cure the resin binder is applied to mixture 34 indirectly by the heated air circulating within chamber 16 about the exterior of core box 32 and directly by the heated air passing through core box 32 so that there is a double stage heat exchange. As a result, the overall heat exchange cycle is highly efficient so that a very rapid curing cycle of the phenolic resin is obtained. After the resin has been cured, blower 10 and heater 12 are shut off and bottom plate 20 is lowered to remove core box 32.

Although this invention has been described in relation to a specific embodiment obvious modifications may be made by one skilled in the art without departing from the intended scope of the invention as defined by the appended claims. For example, it will be evident that the apparatus and method of the invention may be used for curing resin-bonded molds in flasks, as well as cores. Other arrangements for opening and closing the chamber may be used. The bell-shaped hood may be moveable up and down with respect to the bottom plate and/or the heated air may be introduced through an opening in the bottom plate.

We claim:
1. A method of curing a resin-bonded core which comprises passing heated gas about the exterior of a heat-conductive receptacle containing a core composed of a mixture of granular refractory material and an uncured thermosetting binder, then passing said heated gas through said core, and then passing said heated gas through a chamber partly defined by a gas impervious heat conductive wall in said receptacle contacting an inner surface of the core, said heated gas being at a temperature greater than the curing temperature of said binder.

2. A method of curing a resin-bonded annular core which comprises passing heated gas about the exterior of an annular heat-conductive receptacle containing an annulus composed of a mixture of granular refractory material and an uncured thermosetting binder, then passing said heated gas through said mixture, and then passing said heated gas through a chamber partly defined by a gas impervious heat conductive annular wall contacting the inner diameter of said annulus, said heated gas being at a temperature greater than the curing temperature of said binder.

References Cited
UNITED STATES PATENTS

| | | | |
|---|---|---|---|
| 2,860,961 | 11/1958 | Gregor et al. | 264—331 |
| 2,824,345 | 2/1958 | Zifferer | 164—16 |
| 3,074,802 | 1/1963 | Alexander et al. | 164—16 |
| 3,008,205 | 11/1961 | Blaies. | |

JULIUS FROME, Primary Examiner

A. H. KOECKERT, Assistant Examiner

U.S. Cl. X.R.

164—16, 43; 260—38